US012720354B2

(12) United States Patent
Ahmad et al.

(10) Patent No.: US 12,720,354 B2
(45) Date of Patent: Aug. 25, 2026

(54) USER EQUIPMENT MEASUREMENT GAP CONFIGURATION IN A WIRELESS COMMUNICATIONS SYSTEM (WCS)

(71) Applicant: ANI Acquisition Sub, LLC, Boca Raton, FL (US)

(72) Inventors: Syed Noman Ahmad, San Jose, CA (US); Cherayi Kunjunny Mohanakumar, Milpitas, CA (US); Niket Rajesh Shah, Milpitas, CA (US); Yi Yuan, San Jose, CA (US)

(73) Assignee: ANI Acquisition Sub, LLC, Boca Raton, FL (US)

( * ) Notice: Subject to any disclaimer, the term of this patent is extended or adjusted under 35 U.S.C. 154(b) by 293 days.

(21) Appl. No.: 18/499,492

(22) Filed: Nov. 1, 2023

(65) Prior Publication Data

US 2025/0142385 A1 May 1, 2025

(51) Int. Cl.
*H04W 24/10* (2009.01)

(52) U.S. Cl.
CPC .................................... *H04W 24/10* (2013.01)

(58) Field of Classification Search
None
See application file for complete search history.

(56) References Cited

U.S. PATENT DOCUMENTS

2014/0185484 A1* 7/2014 Kim .................. H04W 36/0088 370/252
2018/0098253 A1* 4/2018 Huang .............. H04W 36/0088
2020/0120737 A1* 4/2020 Zhang .................... H04W 76/16
2021/0014714 A1* 1/2021 Kim ....................... H04W 24/10
2023/0156656 A1* 5/2023 Si .......................... H04L 5/0094 455/450
2023/0180173 A1* 6/2023 Kazmi .................... H04L 5/001 455/456.1
2024/0275548 A1* 8/2024 Lee ........................ H04L 5/0051
2025/0071591 A1* 2/2025 Dalsgaard ............ H04W 24/10

* cited by examiner

*Primary Examiner* — Eunsook Choi
(74) *Attorney, Agent, or Firm* — Greenberg Traurig, LLP; Mammen (“Roy”) P. Zachariah

(57) ABSTRACT

User equipment (UE) measurement gap configuration in a wireless communications system (WCS) is disclosed. Herein, a radio access node(s) (e.g., base station) is configured to provide wireless communications services to a UE(s) in a serving cell. The UE(s) monitors link quality in the serving cell and sends a measurement report to the radio access node(s) in response to certain changes in the link quality. Accordingly, the radio access node(s) may determine whether and when to request a UE measurement gap configuration to allow the UE(s) to temporarily suspend communications in the serving cell and monitor radio links in a neighboring cell(s). In embodiments disclosed herein, the radio access node(s) will request the UE measurement gap configuration only when it is determined to be necessary. As such, it is possible to reduce unnecessary service interruption to the UE(s), thus helping to improve throughput and user experience in the serving cell.

19 Claims, 9 Drawing Sheets

RADIO ACCESS SYSTEM 400

MASTER RADIO ACCESS NODE 406 MeNB

X2-C/X2-U

RADIO ACCESS NODE 402 (SgNB)

NETWORKING CIRCUIT 426

PROCESSING CIRCUIT 424

RF FRONTEND CIRCUIT 422

PROTOCOL STACK 428

MASTER SERVING CELL 412

SECONDARY SERVING CELL 416

SECONDARY NEIGHBORING CELL 420

UE

408

404

410

414

418

PROCESS 500

PRECONFIGURE A USER EQUIPMENT (UE) TO PERFORM CHANNEL MEASUREMENT WITHOUT KNOWLEDGE FROM A MASTER ACCESS NODE
501

RECEIVE A MEASUREMENT REPORT (418) INDICATING A LINK QUALITY MEASUREMENT PERFORMED IN A SERVING CELL (416) SERVED BY A RADIO ACCESS NODE (402)
502

DETERMINE WHETHER TO REQUEST A UE MEASUREMENT GAP CONFIGURATION BASED ON THE RECEIVED MEASUREMENT REPORT (418)
504

REQUEST THE UE MEASUREMENT GAP CONFIGURATION IN RESPONSE TO DETERMINING TO REQUEST THE UE MEASUREMENT GAP CONFIGURATION
506

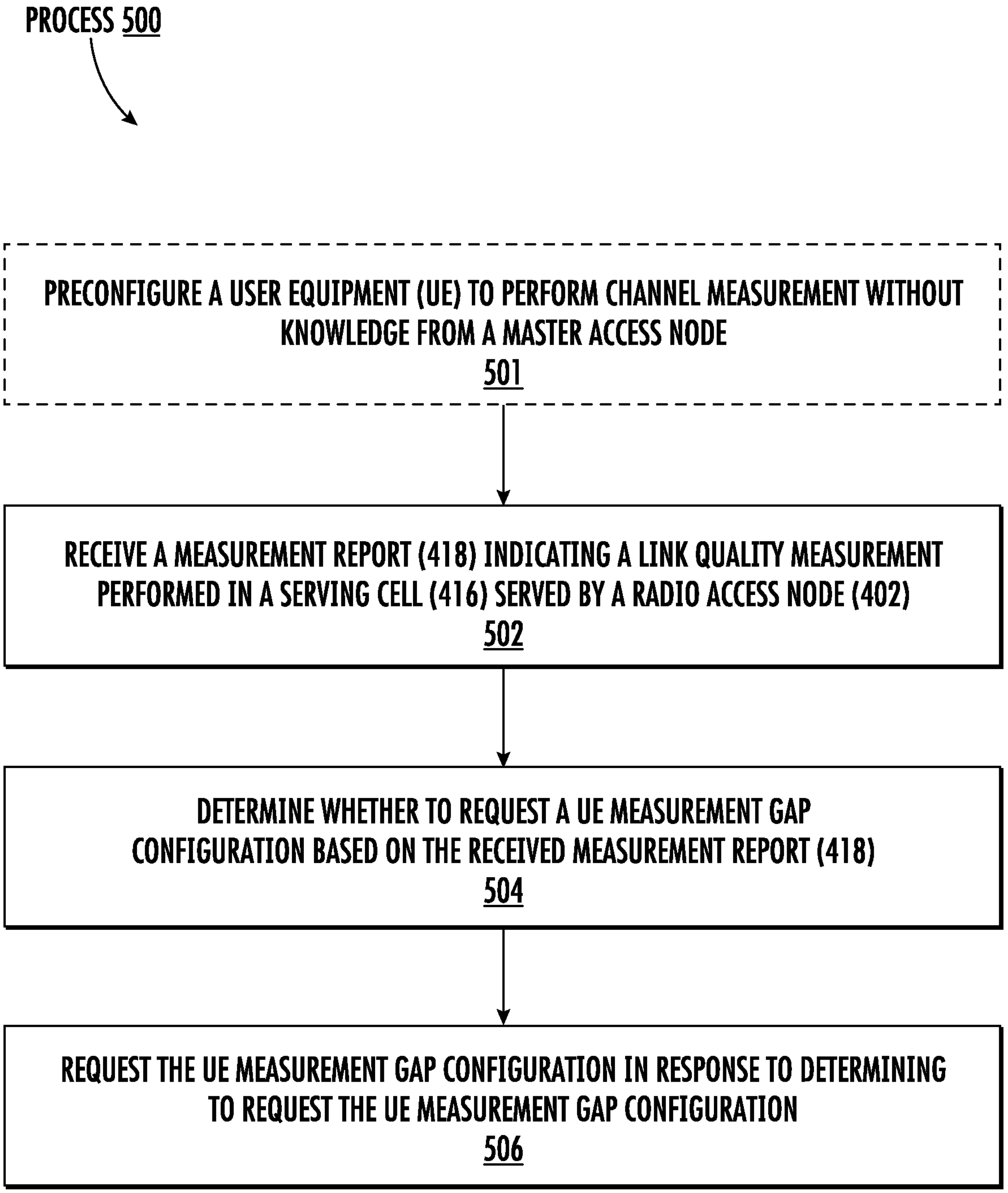

FIG. 5

USER EQUIPMENT MEASUREMENT GAP CONFIGURATION IN A WIRELESS COMMUNICATIONS SYSTEM (WCS)

BACKGROUND

The disclosure relates generally to a user equipment (UE) measurement gap configuration in a wireless communications system (WCS), which can include a fifth generation (5G) non-standalone (NSA) system.

Wireless communication is rapidly growing, with ever-increasing demands for high-speed mobile data communication. As an example, local area wireless services (e.g., so-called "Wi-Fi" systems) and wide area wireless services are being deployed in many different types of areas (e.g., coffee shops, airports, libraries, etc.). Communications systems have been provided to transmit and/or distribute communications signals to wireless nodes called "clients," "client devices," or "wireless client devices," which must reside within the wireless range or "cell coverage area" in order to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a communications system involves the use of radio nodes/base stations that transmit communications signals distributed over physical communications medium remote units forming RF antenna coverage areas, also referred to as "antenna coverage areas." The remote units each contain or are configured to couple to one or more antennas configured to support the desired frequency(ies) of the radio nodes to provide the antenna coverage areas. Antenna coverage areas can have a radius in a range from meters up to kilometers, as an example. Another example of a communications system includes radio nodes, such as base stations, that form cell radio access networks, wherein the radio nodes are configured to transmit communications signals wirelessly directly to client devices without being distributed through intermediate remote units.

For example, FIG. 1 is an example of a WCS 100 that includes a radio node 102 configured to support one or more service providers 104(1)-104(N) as signal sources (also known as "carriers" or "service operators"—e.g., mobile network operators (MNOs)) and wireless client devices 106(1)-106(W). For example, the radio node 102 may be a base station (eNodeB) that includes modem functionality and is configured to distribute communications signal streams 108(1)-108(S) to the wireless client devices 106(1)-106(W) based on communications signals 110(1)-110(N) received from the service providers 104(1)-104(N). The communications signal streams 108(1)-108(S) of each respective service provider 104(1)-104(N) in their different spectrums are radiated through an antenna 112 to the wireless client devices 106(1)-106(W) in a communication range of the antenna 112. For example, the antenna 112 may be an antenna array. As another example, the radio node 102 in the WCS 100 in FIG. 1 can be a small cell radio access node ("small cell") that is configured to support the multiple service providers 104(1)-104(N) by distributing the communications signal streams 108(1)-108(S) for the multiple service providers 104(1)-104(N) based on respective communications signals 110(1)-110(N) received from a respective evolved packet core (EPC) network $CN_1$-$CN_N$ of the service providers 104(1)-104(N) through interface connections. The radio node 102 includes radio circuits 118(1)-118(N) for each service provider 104(1)-104(N) that are configured to create multiple simultaneous RF beams ("beams") 120(1)-120(N) for the communications signal streams 108(1)-108(S) to serve multiple wireless client devices 106(1)-106(W). For example, the multiple RF beams 120(1)-120(N) may support multiple-input, multiple-output (MIMO) communications.

The radio node 102 of the WCS 100 in FIG. 1 may be configured to support service providers 104(1)-104(N) that have a different frequency spectrum and do not share the spectrum. Thus, in this instance, the communications signals 110(1)-110(N) from the different service providers 104(1)-104(N) do not interfere with each other even if transmitted by the radio node 102 at the same time. The radio node 102 may also be configured as a shared spectrum communications system where the multiple service providers 104(1)-104(N) have a shared spectrum. In this regard, the capacity supported by the radio node 102 for the shared spectrum is split (i.e., shared) between the multiple service providers 104(1)-104(N) for providing services to the subscribers.

The radio node 102 in FIG. 1 can also be coupled to a distributed communications system (DCS), such as a distributed antenna system (DAS), such that the radio circuits 118(1)-118(N) remotely distribute the communications signals 110(1)-110(N) of the multiple service providers 104(1)-104(N) to remote units. The remote units can each include an antenna array that includes tens or even hundreds of antennas for concurrently radiating the communications signals 110(1)-110(N) to subscribers using spatial multiplexing. Herein, the spatial multiplexing is a scheme that takes advantage of the differences in RF channels between transmitting and receiving antennas to provide multiple independent streams between the transmitting and receiving antennas, thus increasing throughput by sending data over parallel streams. Accordingly, the remote units can be said to radiate the communications signals 110(1)-110(N) to subscribers based on a massive multiple-input multiple-output (M-MIMO) scheme.

The WCS 100 may be configured to operate as a 5G standalone (SA) system or a 5G non-standalone (NSA) system. When operating as the 5G SA system, the radio node 102 can function as a 5G or 5G-NR base station (a.k.a. gNodeB) to service the wireless client devices 106(1)-106(W). When operating as the 5G NSA system, the radio node 102 can function as a master base station (a.k.a. MeNB) to provide control plane (C-plane) services to the wireless client devices 106(1)-106(W) or as a secondary base station (a.k.a. SgNB) to provide user plane (U-plane) services to the wireless client devices 106(1)-106(W).

SUMMARY

Embodiments disclosed herein include a user equipment (UE) measurement gap configuration in a wireless communications system (WCS). Herein, a radio access node(s) (e.g., base station) is configured to provide wireless communications services to a UE(s) in a serving cell. The UE(s) monitors link quality in the serving cell and sends a measurement report to the radio access node(s) in response to certain changes in the link quality. In a non-limiting example, the UE(s) can send the measurement report to indicate that the link quality in the serving cell is worse than a threshold. Accordingly, the radio access node(s) may determine whether to request a UE measurement gap configuration to allow the UE(s) to temporarily suspend communications in the serving cell and monitor radio links in a neighboring cell(s). In embodiments disclosed herein, the radio access node(s) will request the UE measurement gap configuration only when it is determined to be necessary. As such, it is possible to reduce unnecessary service interruption to the UE(s), thus helping to improve throughput and user experience in the serving cell.

One exemplary embodiment of the disclosure relates to a radio access node. The radio access node includes a radio frequency (RF) frontend circuit. The RF frontend circuit is configured to receive a measurement report indicating a link quality measurement performed in a serving cell served by the radio access node. The radio access node also includes a processing circuit. The processing circuit is configured to determine whether to request a UE measurement gap configuration based on the received measurement report. The processing circuit is also configured to request the UE measurement gap configuration in response to determining to request the UE measurement gap configuration.

An additional exemplary embodiment of the disclosure relates to a method for configuring a UE measurement gap in a WCS. The method includes receiving a measurement report indicating a link quality measurement performed in a serving cell served by a radio access node. The method also includes determining whether to request a UE measurement gap configuration based on the received measurement report. The method also includes initiating the UE measurement gap configuration in response to determining to request the UE measurement gap configuration.

An additional exemplary embodiment of the disclosure relates to a WCS. The WCS includes a distribution unit. The distribution unit is configured to distribute a plurality of data signals. The WCS also includes a plurality of radio access nodes coupled to the distribution unit. At least one of the plurality of radio access nodes includes an RF frontend circuit. The RF frontend circuit is configured to receive a measurement report indicating a link quality measurement performed in a serving cell served by the at least one of the plurality of radio access nodes. The at least one of the plurality of radio access nodes also includes a processing circuit. The processing circuit is configured to determine whether to request a UE measurement gap configuration based on the received measurement report. The processing circuit is also configured to request the UE measurement gap configuration in response to determining to request the UE measurement gap configuration.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 5 is a flowchart of an exemplary process whereby the radio access node of FIG. 4 can request the UE measurement gap according to embodiments of the present disclosure;

DETAILED DESCRIPTION

Embodiments disclosed herein include a user equipment (UE) measurement gap configuration in a wireless communications system (WCS). Herein, a radio access node(s) (e.g., base station) is configured to provide wireless communications services to a UE(s) in a serving cell. The UE(s) monitors link quality in the serving cell and sends a measurement report to the radio access node(s) in response to certain changes in the link quality. In a non-limiting example, the UE(s) can send the measurement report to indicate that the link quality in the serving cell is worse than a threshold. Accordingly, the radio access node(s) may determine whether to request the UE measurement gap configuration to allow the UE(s) to temporarily suspend communications in the serving cell and monitor radio links in a neighboring cell(s). In embodiments disclosed herein, the radio access node(s) will request the UE measurement gap configuration only when it is determined to be necessary. As such, it is possible to reduce unnecessary service interruption to the UE(s), thus helping to improve throughput and user experience in the serving cell.

Figure 1:
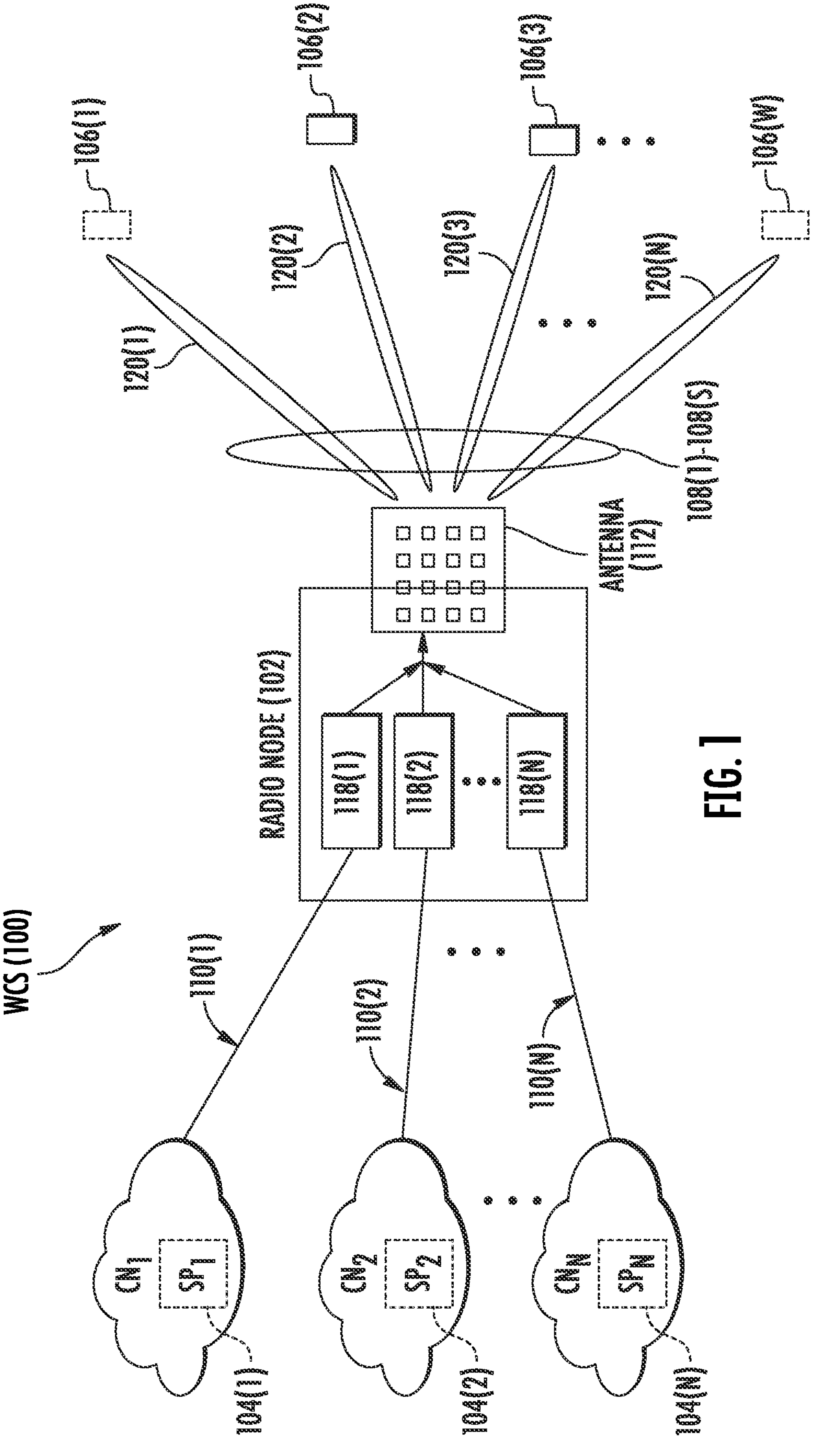
FIG. 1 is a schematic diagram of an exemplary wireless communications system (WCS), such as a distributed communications system (DCS), configured to distribute communications services to remote coverage areas.
Figure 2:
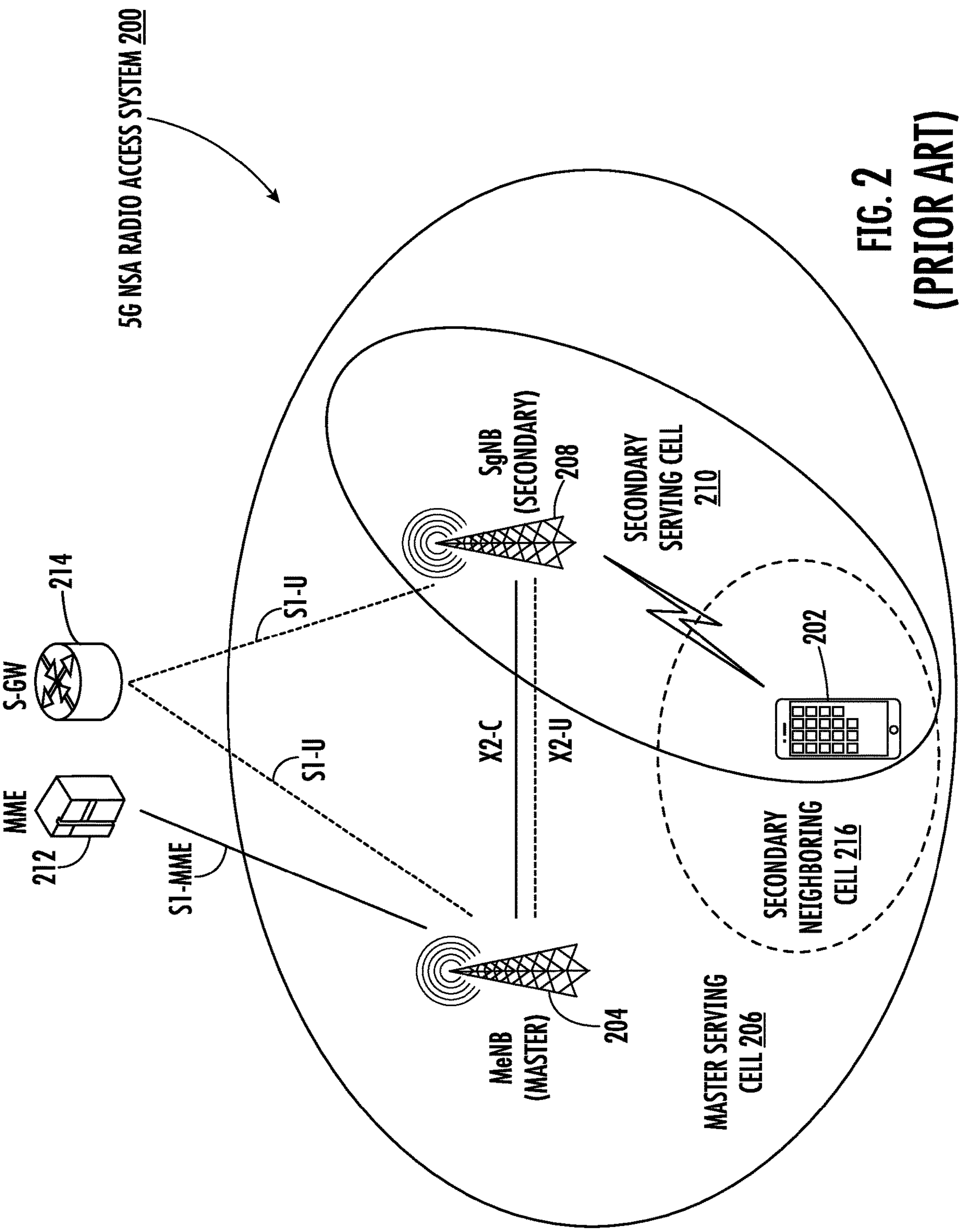
FIG. 2 is a schematic diagram of an exemplary fifth generation (5G) non-standalone (NSA) radio access system wherein at least one user equipment (UE) is concurrently connected to a master radio node in a master serving cell and to a secondary radio access node in a secondary serving cell.
Figure 3:
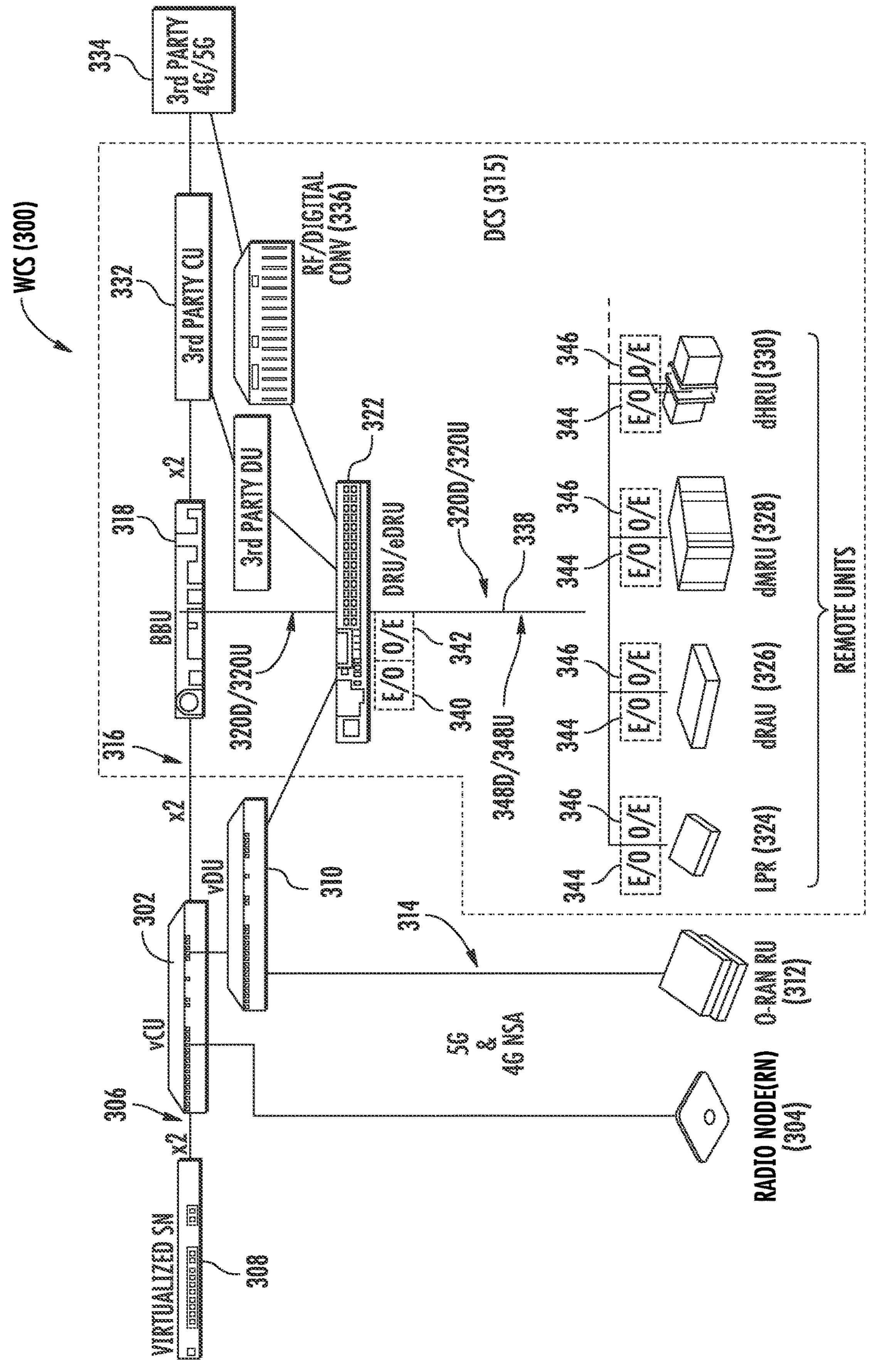
FIG. 3 is a schematic diagram of an exemplary WCS that can be configured according to various embodiments of the present disclosure to configure a UE measurement gap only when deemed necessary to help improve data throughput and user experience in the WCS.

Before discussing the radio access node of the present disclosure configured to configure the UE measurement gap in the WCS, starting at FIG. 3, a brief overview of a fifth generation (5G) non-standalone (NSA) radio access system is first provided with reference to FIG. 2 to help explain the technical problem to be solved by embodiments of the present disclosure.

In this regard, FIG. 2 is a schematic diagram of an exemplary 5G NSA radio access system 200 wherein at least one UE 202 is concurrently connected to a master radio node 204 (a.k.a. MeNB) in a master serving cell 206 and to a secondary radio access node 208 (a.k.a. SgNB) in a secondary serving cell 210. Herein, the master radio node 204 is configured to serve the master serving cell 206 based on long-term evolution (LTE) radio access technology, while the secondary radio access node 208 serves the secondary serving cell 210 based on 5G radio access technology. The master radio access node 204 can exchange mobility management entity (MME) messages with an MME 212 via an S1-MME and exchange user-plane messages with a serving gateway (S-GW) 214 via an S1-U link. The secondary radio access node 208, on the other hand, can also exchange user-plane messages with the serving gateway (S-GW) 214 via the S1-U link. The master radio access node 204 can also exchange control-plane messages and user-plane messages directly with the secondary radio access node 208 via an X2-C link and an X2-U link, respectively.

The UE 202 is connected concurrently to the master radio access node 204 and the secondary radio access node 208 via a technique commonly known as enhanced dual-connectivity (EN-DC). Specifically, the UE 202 is configured to receive control plane configurations, such as radio resource control (RRC) configuration, from the master radio access node 204 and communicate downlink and uplink data through the secondary radio access node 208.

Given that the secondary serving cell 210 is typically smaller than the master serving cell 206, the UE 202 may move in and out the secondary serving cell 210 while still connected to the master radio access node 204 in the master serving cell 206. To maintain communications with the secondary radio access node 208, the UE 202 needs to monitor the link quality in the secondary serving cell 210. For example, the UE 202 can measure a received power level of a sounding reference signal (SRS) to help determine the link quality in the secondary serving cell 210. The UE 202 may report the measured link quality to the secondary radio access node 208 in response to a trigger event(s). For example, the UE 202 can report the measured link quality to the secondary radio access node 208 when the measured link quality in the secondary serving cell 210 becomes worse than a threshold (a.k.a. Event A2).

In response to receiving the reported link quality measurement, the secondary radio access node 208 can configure and communicate a UE measurement gap in the secondary serving cell 210 such that the UE 202 can temporarily suspend downlink and uplink communications with the secondary radio access node 208 to search for a secondary neighboring cell 216, which is operating based on a different frequency from the secondary serving cell 210. As of now, the 5G NSA standard as defined by third-generation partnership project (3GPP) does not explicitly specify how and when the secondary radio access node 208 should configure the UE measurement gap in the secondary serving cell 210. As a result, the secondary radio access node 208 may be configured to configure and communicate the UE measurement gap immediately upon receiving the link quality measurement from the UE 202. Understandably, since the UE 202 must suspend downlink and uplink communications with the secondary radio access node 208 during the UE measurement gap, the UE may suffer a reduced data throughput, which may lead to an unsatisfactory user experience. As such, it is desirable to configure and communicate the UE measurement gap only when it is necessary to help improve data throughput and user experience in the secondary serving cell 210.

In this regard, FIG. 3 is a schematic diagram of an exemplary WCS 300 that can be configured according to various embodiments of the present disclosure to configure the UE measurement gap only when deemed necessary to help improve data throughput and user experience in the WCS 300. The WCS 300 supports both legacy 4G LTE and 5G NSA communications systems. As shown in FIG. 3, a centralized services node 302 is provided and is configured to interface with a core network to exchange communications data and distribute the communications data as radio signals to various wireless nodes. In this example, the centralized services node 302 is configured to support distributed communications services to a radio node 304 (e.g., 5G or 5G-NR gNB). Despite the fact that only one radio node 304 is shown in FIG. 3, it should be appreciated that the WCS 300 can be configured to include additional numbers of the radio node 304, as needed.

The functions of the centralized services node 302 can be virtualized through, for example, an x2 interface 306 to another services node 308. The centralized services node 302 can also include one or more internal radio nodes that are configured to be interfaced with a distribution unit (DU) 310 to distribute communications signals to one or more open radio access network (O-RAN) remote units (RUs) 312 that are configured to be communicatively coupled through an O-RAN interface 314. The O-RAN RUs 312 are each configured to communicate downlink and uplink communications signals in a respective coverage cell.

The centralized services node 302 can also be interfaced with a distributed communications system (DCS) 315 through an x2 interface 316. Specifically, the centralized services node 302 can be interfaced with a digital baseband unit (BBU) 318 that can provide a digital signal source to the centralized services node 302. The digital BBU 318 may be configured to provide a signal source to the centralized services node 302 to provide downlink communications signals 320D to a digital routing unit (DRU) 322 as part of a digital distributed antenna system (DAS). The DRU 322 is configured to split and distribute the downlink communications signals 320D to different types of remote units, including a low-power remote unit (LPR) 324, a radio antenna unit (dRAU) 326, a mid-power remote unit (dMRU) 328, and a high-power remote unit (dHRU) 330. The DRU 322 is also configured to combine uplink communications signals 320U received from the LPR 324, the dRAU 326, the dMRU 328, and the dHRU 330 and provide the combined uplink communications signals to the digital BBU 318. The digital BBU 318 is also configured to interface with a third-party central unit 332 and/or an analog source 334 through a radio frequency (RF)/digital converter 336.

The DRU 322 may be coupled to the LPR 324, the dRAU 326, the dMRU 328, and the dHRU 330 via an optical fiber-based communications medium 338. In this regard, the DRU 322 can include a respective electrical-to-optical (E/O) converter 340 and a respective optical-to-electrical (O/E) converter 342. Likewise, each of the LPR 324, the dRAU 326, the dMRU 328, and the dHRU 330 can include a respective E/O converter 344 and a respective O/E converter 346.

The E/O converter 340 at the DRU 322 is configured to convert the downlink communications signals 320D into downlink optical communications signals 348D for distribution to the LPR 324, the dRAU 326, the dMRU 328, and the dHRU 330 via the optical fiber-based communications medium 338. The O/E converter 346 at each of the LPR 324, the dRAU 326, the dMRU 328, and the dHRU 330 is configured to convert the downlink optical communications signals 348D back to the downlink communications signals 320D. The E/O converter 344 at each of the LPR 324, the dRAU 326, the dMRU 328, and the dHRU 330 is configured to convert the uplink communications signals 320U into uplink optical communications signals 348U. The O/E converter 342 at the DRU 322 is configured to convert the uplink optical communications signals 348U back to the uplink communications signals 320U.

In context of the present disclosure, a radio access node refers generally to a wireless communication circuit including at least a processing circuit, a memory circuit, and an antenna circuit, and can be configured to process, transmit, and receive a wireless communications signal. In this regard, any of the radio node 304 and the O-RAN RN 312 can function as the master radio access node 204 or the secondary radio access node 208 in the 5G NSA radio access system 200 of FIG. 2. Accordingly, any of the radio node 304 and the O-RAN RN 312 can be configured to configure the UE measurement gap according to embodiments of the present disclosure.

Figure 4:
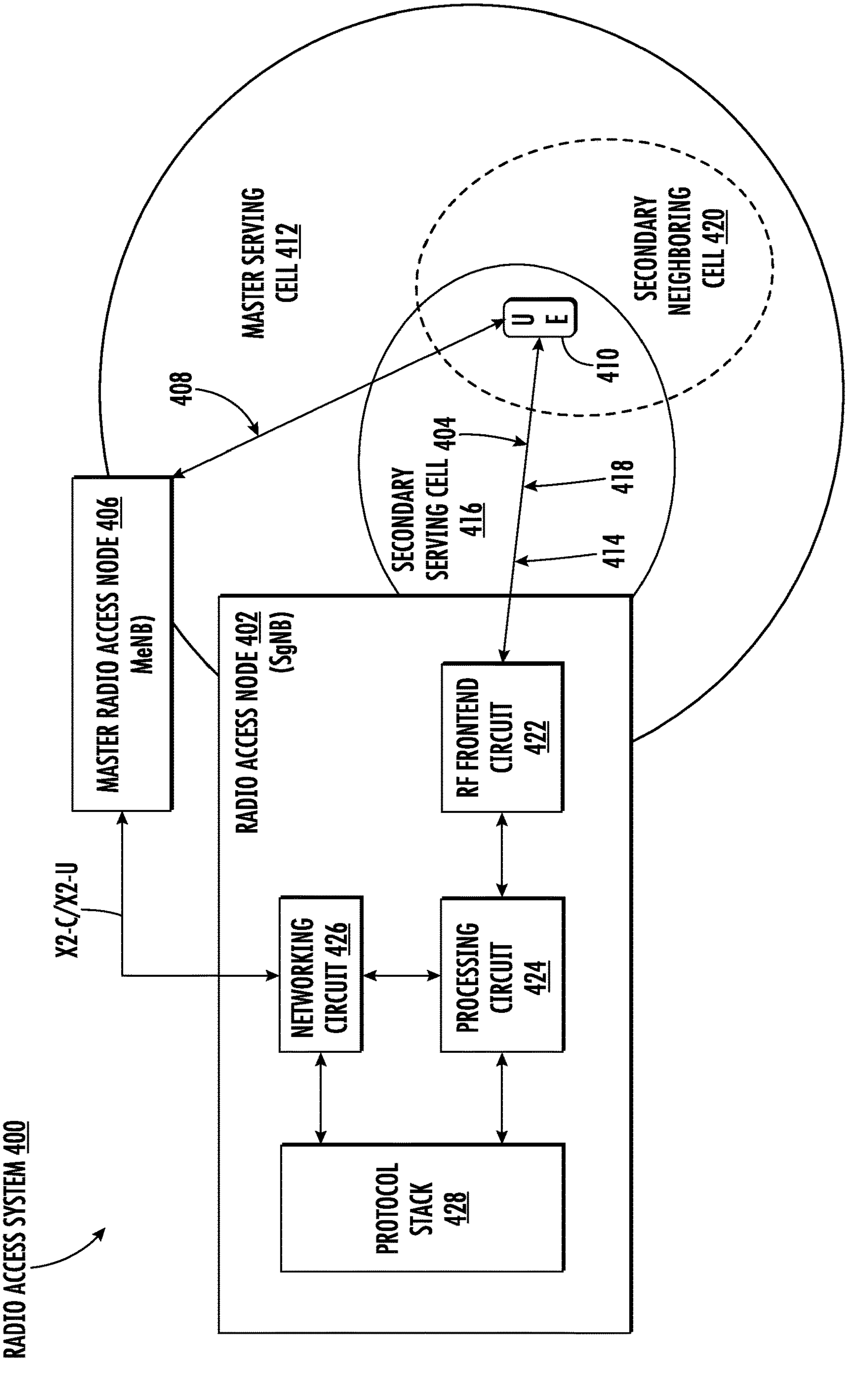
FIG. 4 is a schematic diagram of an exemplary radio access system, wherein a radio access node can request the UE measurement gap according to embodiments of the present disclosure.

FIG. 4 is a schematic diagram of an exemplary radio access system 400, wherein a radio access node 402 can request a UE measurement gap 404 according to embodiments of the present disclosure. In a non-limiting example, the radio access system 400 is a 5G NSA radio access system. In this regard, the radio access system 400 further includes a master radio access node 406 that is identical to the master radio access node 204 (MeNB) in FIG. 2. The radio access node 402, on the other hand, is functionally equivalent, but not identical, to the secondary radio access node 208 (SgNB) in FIG. 2. As previously described in FIG. 2, the master radio access node 406 is configured to communicate a control plane message(s) 408 with at least one UE 410 in a master serving cell 412, while the radio access node 402 exchanges a user plane message(s) 414 with the UE 410 in a secondary serving cell 416. Notably, although the secondary serving cell 416 illustrated herein is completely overlapped with the master serving cell 412, it should be appreciated that this is not a requirement for initiating the UE measurement gap 404 according to embodiments of the present disclosure. Further, the secondary serving cell 416 may be part of same or different gNB.

Like the UE 202 in FIG. 2, the UE 410 is configured to perform a link quality measurement in the secondary serving cell 416 and send a measurement report 418 indicating the measured link quality to the radio access node 402 in response to one or more triggering events. In a non-limiting example, the UE 410 is configured (e.g., via measurement configuration) to send the measurement report 418 to the radio access node 402 in response to Event A2.

Contrary to the secondary radio access node 208 in FIG. 2, the radio access node 402 is configured to determine whether to request a configuration for the UE measurement gap 404 for measuring a secondary neighboring cell 420, such as the secondary neighboring cell 218 in FIG. 2, based on the received measurement report 418. Herein, the radio access node 402 will only request the master radio access node 406 to make the configuration for the UE measurement gap 404 when the UE measurement gap 404 is deemed necessary. In an embodiment, the radio access node 402 may determine whether it is necessary to request the master radio access node 406 to configure the UE measurement gap 404 based on a predefined threshold, which may be predefined or configurable. More specifically, the radio access node 402 may compare the link quality measurement received in the measurement report 418 with the predefined threshold. Accordingly, the radio access node 402 can determine to request configuration for the UE measurement gap 404 when the link quality measurement is below the predefined threshold or hold off configuration for the UE measurement gap 404 when the link quality measurement is above or equal to the predefined threshold. By delaying the configuration for the UE measurement gap 404 when the link quality measurement is above or equal to the predefined threshold, it is possible to reduce unnecessary service user plane throughput impact to the UE 410, thus helping to improve data throughput and overall user experience in the secondary serving cell 416.

In an embodiment, the radio access node 402 includes a radio frequency (RF) frontend circuit 422, a processing circuit 424, a networking circuit 426, and a protocol stack 428. The RF frontend circuit 422, which can include a power amplifier(s), a low-noise amplifier(s), a power management integrated circuit(s), a transmit/receive filter circuit(s), and an antenna circuit(s), can be configured to receive the measurement report 418 and transmit the UE measurement gap 404 in the secondary serving cell 416. The processing circuit 424, which can be a field-programmable gate array (FPGA), an application-specific integrated circuit (ASIC), or a general-purpose processor, as an example, can be configured to determine whether to request configuration for the UE measurement gap 404 based on the received measurement report 418. The networking circuit 426 can be configured to exchange control-plane messages X2-C and user-plane messages X2-U directly with the master radio access node 406. The protocol stack 428, which may be a memory circuit, as an example, is configured to store communication protocols of all open system interconnection (OSI) layers, including but not limited to LTE and 5G communication protocols.

The radio access node 402 may be configured to request the master radio access node 406 to configure the UE measurement gap 404 based on a process. In this regard, FIG. 5 is a flowchart of an exemplary process 500 whereby the radio access node 402 of FIG. 4 can request the configuration of the UE measurement gap 404 according to embodiments of the present disclosure.

In an embodiment, the radio access node 402 may preconfigure, without knowledge of the master radio access node 406, the UE 410 to perform channel measurement (block 501). Herein, the RF frontend circuit 422 receives the measurement report 418 indicating that a link quality measurement performed in the secondary serving cell 416 (a.k.a. serving cell) served by the radio access node 402 (block 502). Accordingly, the processing circuit 424 is configured to determine whether to request a configuration for the UE measurement gap 404 based on the received measurement report 418 (block 504). In response to determining to request configuration for the UE measurement gap 404, the processing circuit 424 can cause the networking circuit 426 to communicate with the master radio access node 406 to configure the UE measurement gap 404 (block 506).

Figure 6:
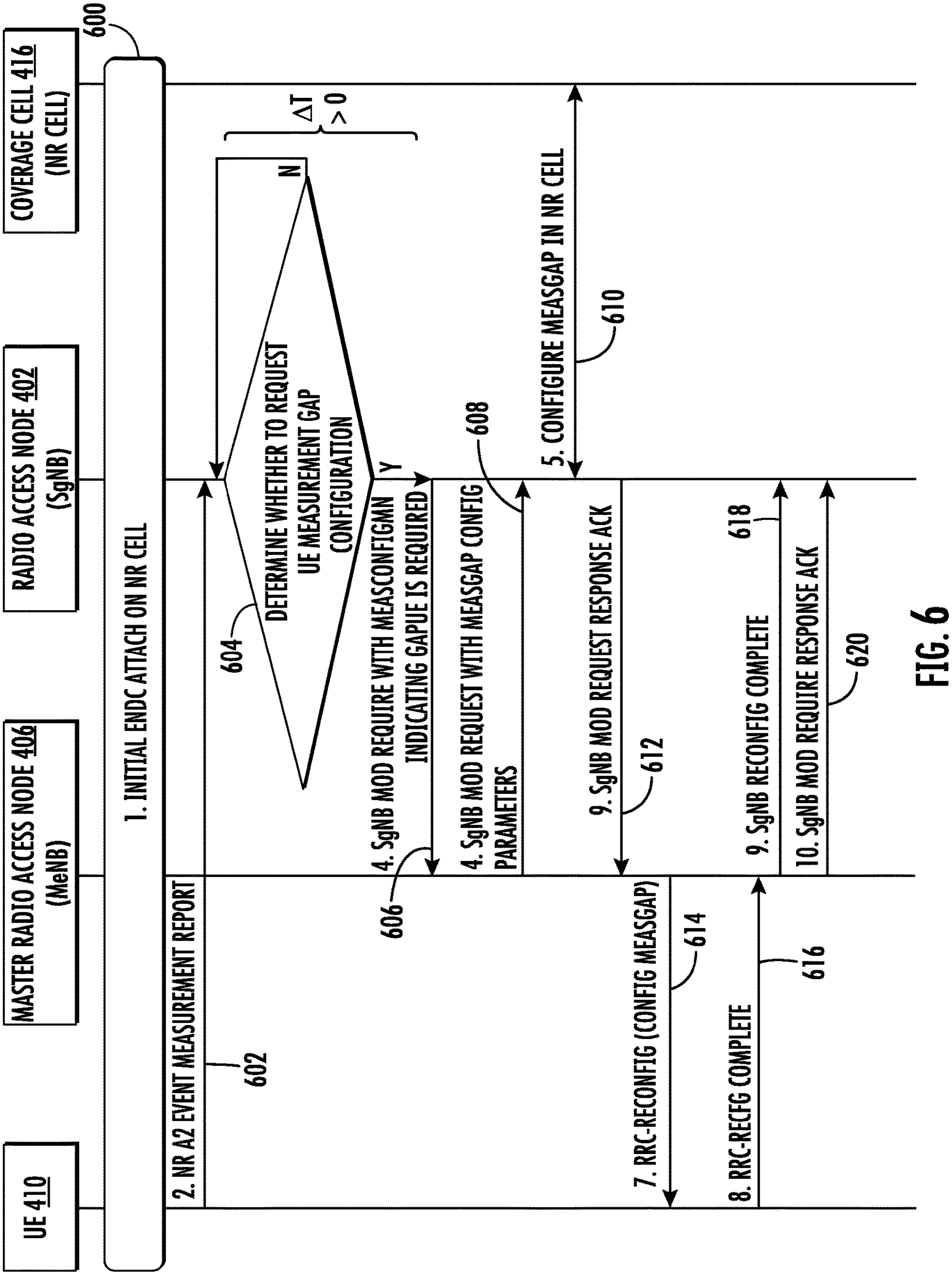
FIG. 6 is a signal flow diagram providing an exemplary illustration as to how the radio access system of FIG. 4 can be configured to configure the UE measurement gap based on embodiments of the present disclosure.

With reference back to FIG. 4, the radio access node 402, the master radio access node 406, and the UE 410 in the radio access system 400 must collaborate to configure the UE measurement gap 404 according to embodiments of the present disclosure. In this regard. FIG. 6 is a signal flow diagram providing an exemplary illustration as to how the radio access system 400 of FIG. 4 can be configured to configure and communicate the UE measurement gap 404 based on embodiments of the present disclosure. Common elements between FIGS. 4 and 6 are shown therein with common element numbers and will not be re-described herein.

Herein, the UE 410 is attached to the master radio access node 406 in the master serving cell 412 and to the radio access node 402 in the secondary serving cell 416 (step 600). Herein. NR A1/A2/A4/A5 measurement reports are configured to the UE 410, wherein A1/A2 are for reporting serving cell signal strength and A4/A5 are for inter-frequency handover purpose. In response to Event A2, the UE 410 transmits the measurement report 418 to the radio access node 402 to indicate that the measured link quality in the secondary serving cell 416 has become worse than the predefined threshold (step 602).

In response to receiving the measurement report 418, the radio access node 402 determines whether to request configuration for the UE measurement gap 404 (step 604). If the radio access node 402 determines not to request configuration for the UE measurement gap 404, the radio access node 402 will simply stay put. Should the radio access node 402 determine to request configuration for the UE measurement gap 404, the radio access node 402 will start a SgNB modification procedure by sending a measConfigMN message to the master radio access node 406 (step 606). This message includes measConfigSN information element indicating the channels UE is configured already to measure. According to an embodiment of the present disclosure, the UE 410 may have been instructed (e.g., by the radio access node 402 during step 600), without knowledge from the master radio access node 406, to monitor and/or report channel conditions. Regardless of whether the UE 410 monitors the channel condition, the radio access node 402 will only request the master radio access node 406 to configure the UE measurement gap 404 when the link quality measurement received in the measurement report 418 drops below the predefined threshold.

The master radio access node 406, in response, determines that the measurement gap 404 is needed for the UE 410 to report A4/A5 and then sends a set of parameters for configuring the UE measurement gap 404 to the radio access node 402 in a SgNB modification request (step 608). The radio access node 402, in turn, broadcasts the set of parameters in the secondary serving cell 416 (step 610). The radio access node 402 subsequently sends a SgNB modification request Acknowledgement to the master radio access node 406 (step 612).

The master radio access node 406 then instructs the UE 410 through an RRC reconfig request to configure the UE measurement gap 404 based on the set of parameters previously sent by the radio access node 402 (step 614). The UE 410, in turn, sends an RRC reconfig complete message to the master radio access node 406 after configuring the UE measurement gap 404 (step 616). The master radio access node 406 then sends an SgNB reconfig complete message to the radio access node 402 to indicate completion of the RRC reconfig at the UE 410 (step 618). Subsequently, the master radio access node 406 sends an SgNB modification require Acknowledgement to the radio access node 402 to conclude the UE measurement gap configuration (step 620).

Figure 7:
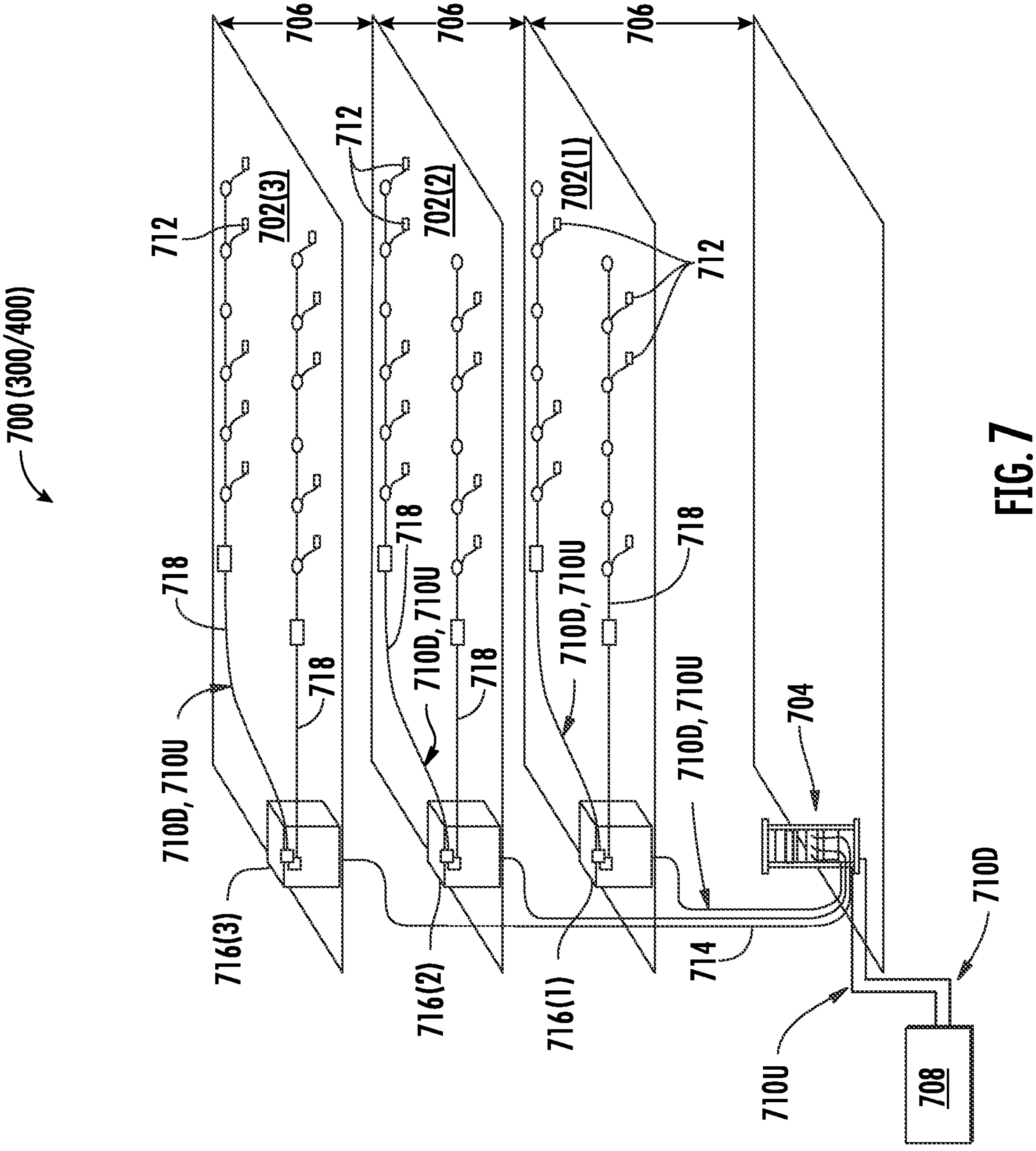
FIG. 7 is a partial schematic cut-away diagram of an exemplary building infrastructure in a WCS, such as the WCS of FIG. 3 that includes the radio access node of FIG. 4 to configure the UE measurement gap based on embodiments of the present disclosure.

The WCS 300 of FIG. 3, which can include the radio access node 402 in FIG. 4, can be provided in an indoor environment as illustrated in FIG. 7. FIG. 7 is a partial schematic cut-away diagram of an exemplary building infrastructure 700 in a WCS, such as the WCS 300 of FIG. 3 that includes the radio access node 402 of FIG. 4 to configure the UE measurement gap 404 according to embodiments of the present disclosure. The building infrastructure 700 in this embodiment includes a first (ground) floor 702(1), a second floor 702(2), and a third floor 702(3). The floors 702(1)-702(3) are serviced by a central unit 704 to provide antenna coverage areas 706 in the building infrastructure 700. The central unit 704 is communicatively coupled to a base station 708 to receive downlink communications signals 710D from the base station 708. The central unit 704 is communicatively coupled to a plurality of remote units 712 to distribute the downlink communications signals 710D to the remote units 712 and to receive uplink communications signals 710U from the remote units 712, as previously discussed above. The downlink communications signals 710D and the uplink communications signals 710U communicated between the central unit 704 and the remote units 712 are carried over a riser cable 714. The riser cable 714 may be routed through interconnect units (ICUs) 716(1)-716(3) dedicated to each of the floors 702(1)-702(3) that route the downlink communications signals 710D and the uplink communications signals 710U to the remote units 712 and also provide power to the remote units 712 via array cables 718.

Figure 8:
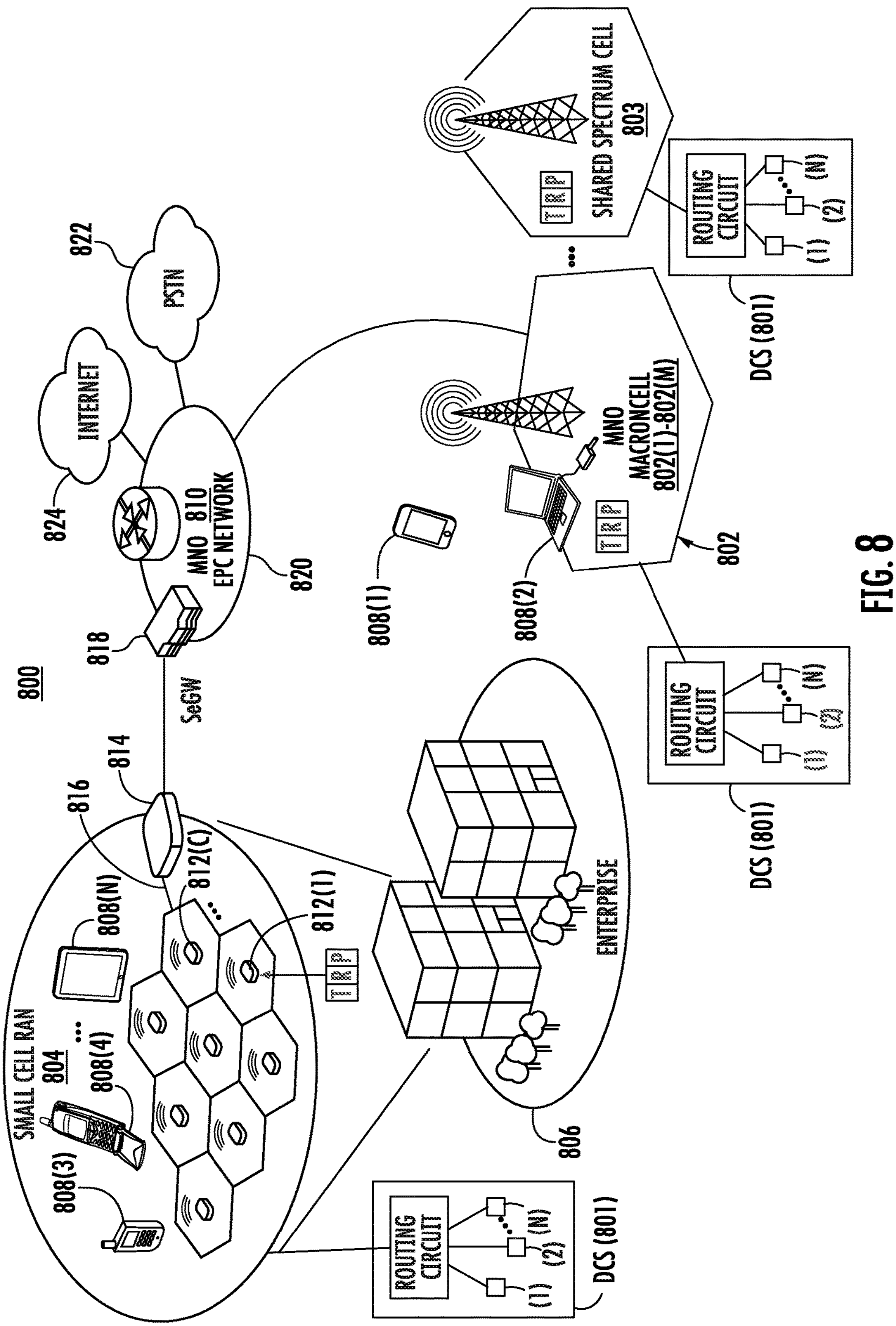
FIG. 8 is a schematic diagram of an exemplary mobile telecommunications environment that can include the WCS of FIG. 3 that includes the radio access node of FIG. 4 to configure the UE measurement gap based on embodiments of the present disclosure.

The WCS 300 of FIG. 3, which can include the radio access node 402 of FIG. 4, configured to configure the UE measurement gap 404, can also be interfaced with different types of radio nodes of service providers and/or supporting service providers, including macrocell systems, small cell systems, and remote radio heads (RRH) systems, as examples. For example. FIG. 8 is a schematic diagram of an exemplary mobile telecommunications environment 800 (also referred to as "environment 800") that includes radio nodes and cells that may support shared spectrum, such as unlicensed spectrum, and can be interfaced to shared spectrum WCSs 801 supporting coordination of distribution of shared spectrum from multiple service providers to remote units to be distributed to subscriber devices. The shared spectrum WCSs 801 can include the WCS 300 of FIG. 3 that includes the radio access node 402 of FIG. 4, as an example.

The environment 800 includes exemplary macrocell RANs 802(1)-802(M) ("macrocells 802(1)-802(M)") and an exemplary small cell RAN 804 located within an enterprise environment 806 and configured to service mobile communications between a user mobile communications device 808(1)-808(N) to a mobile network operator (MNO) 810. A serving RAN for the user mobile communications devices 808(1)-808(N) is a RAN or cell in the RAN in which the user mobile communications devices 808(1)-808(N) have an established communications session with the exchange of mobile communications signals for mobile communications. Thus, a serving RAN may also be referred to herein as a serving cell. For example, the user mobile communications devices 808(3)-808(N) in FIG. 8 are being serviced by the small cell RAN 804, whereas the user mobile communications devices 808(1) and 808(2) are being serviced by the macrocell 802. The macrocell 802 is an MNO macrocell in this example. However, a shared spectrum RAN 803 (also referred to as "shared spectrum cell 803") includes a macrocell in this example and supports communications on frequencies that are not solely licensed to a particular MNO, such as CBRS for example, and thus may service user mobile communications devices 808(1)-808(N) independent of a particular MNO. For example, the shared spectrum cell 803 may be operated by a third party that is not an MNO and wherein the shared spectrum cell 803 supports CBRS. Also, as shown in FIG. 8, the MNO macrocell 802, the shared spectrum cell 803, and/or the small cell RAN 804 can interface with a shared spectrum WCS 801 supporting coordination of distribution of shared spectrum from multiple service providers to remote units to be distributed to subscriber devices. The MNO macrocell 802, the shared spectrum cell 803, and the small cell RAN 804 may be neighboring radio access systems to each other, meaning that some or all can be in proximity to each other such that a user mobile communications device 808(3)-808(N) may be able to be in communications range of two or more of the MNO macrocell 802, the shared spectrum cell 803, and the small cell RAN 804 depending on the location of the user mobile communications devices 808(3)-808(N).

In FIG. 8, the mobile telecommunications environment 800 in this example is arranged as an LTE system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 800 includes the enterprise environment 806 in which the small cell RAN 804 is implemented. The small cell RAN 804 includes a plurality of small cell radio nodes 812(1)-812(C). Each small cell radio node 812(1)-812(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 8, the small cell RAN 804 includes one or more services nodes (represented as a single services node 814) that manage and control the small cell radio nodes 812(1)-812(C). In alternative implementations, the management and control functionality may be incorporated into a radio node, distributed among nodes, or implemented remotely (i.e., using infrastructure external to the small cell RAN 804). The small cell radio nodes 812(1)-812(C) are coupled to the services node 814 over a direct or local area network (LAN) connection 816 as an example, typically using secure IPsec tunnels. The small cell radio nodes 812(1)-812(C) can include multi-operator radio nodes. The services node 814 aggregates voice and data traffic from the small cell radio nodes 812(1)-812(C) and provides connectivity over an IPsec tunnel to a security gateway (SeGW) 818 in a network 820 (e.g., evolved packet core (EPC) network in a 4G network, or 5G Core in a 5G network) of the MNO 810. The network 820 is typically configured to communicate with a public switched telephone network (PSTN) 822 to carry circuit-switched traffic, as well as for communicating with an external packet-switched network such as the Internet 824.

The environment 800 also generally includes a node (e.g., eNodeB or gNodeB) base station, or "macrocell" 802. The radio coverage area of the macrocell 802 is typically much larger than that of a small cell where the extent of coverage often depends on the base station configuration and surrounding geography. Thus, a given user mobile communications device 808(3)-808(N) may achieve connectivity to the network 820 (e.g., EPC network in a 4G network, or 5G Core in a 5G network) through either a macrocell 802 or small cell radio node 812(1)-812(C) in the small cell RAN 804 in the environment 800.

Figure 9:
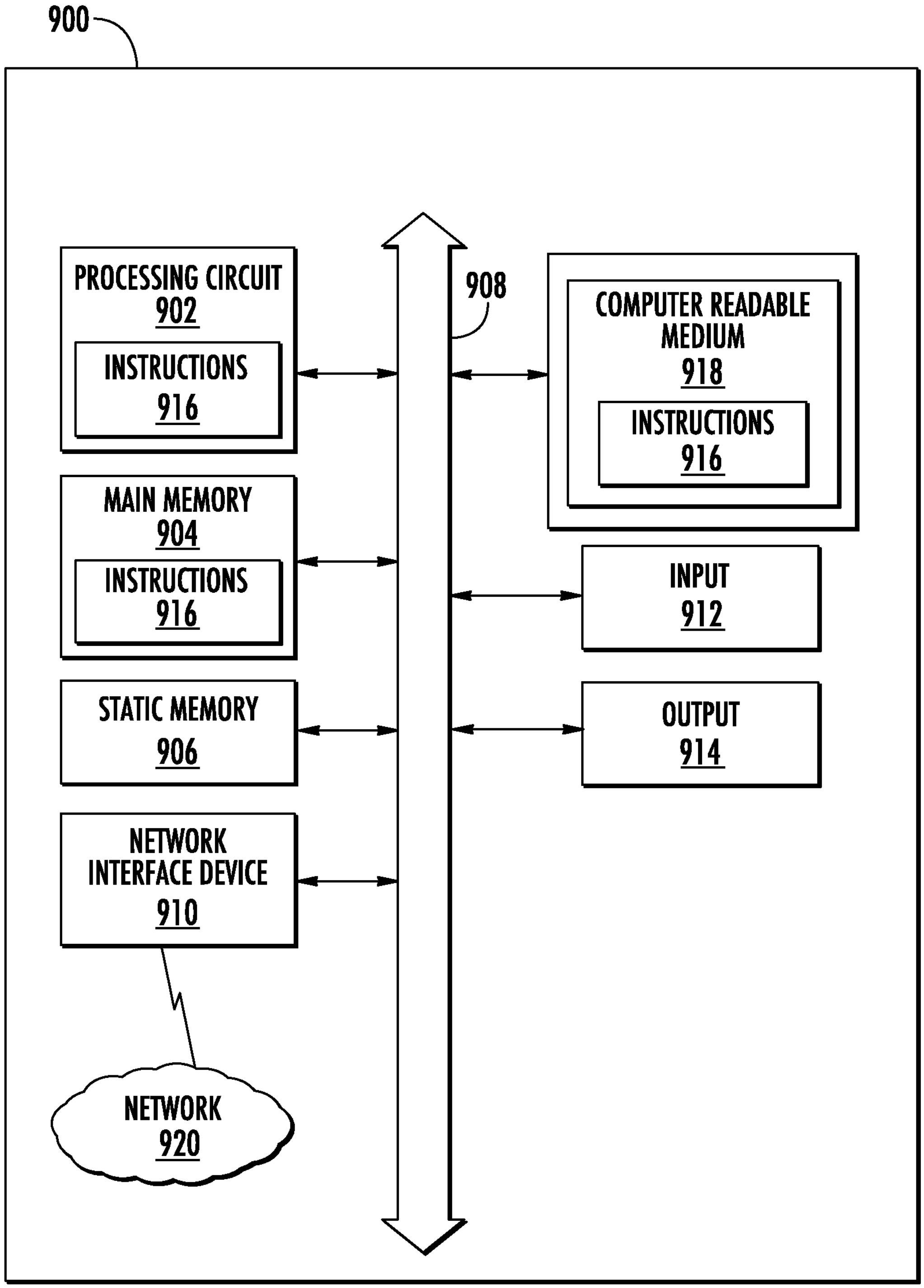
FIG. 9 is a schematic diagram of a representation of an exemplary computer system that can be included in or interfaced with any of the components in the WCS of FIG. 3 and the radio access node in FIG. 4 to configure the UE measurement gap based on embodiments of the present disclosure, wherein the exemplary computer system is configured to execute instructions from an exemplary computer-readable medium.

Any of the circuits in the WCS 300 of FIG. 3 and the radio access node 402 of FIG. 4, such as the processing circuit 424, can include a computer system 900, such as that shown in FIG. 9, to carry out their functions and operations. With reference to FIG. 9, the computer system 900 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 900 in this embodiment includes a processing circuit or processor 902, a main memory 904 (e.g., read-only memory (ROM), flash memory, dynamic random access memory (DRAM) such as synchronous DRAM (SDRAM), etc.), and a static memory 906 (e.g., flash memory, static random access memory (SRAM), etc.), which may communicate with each other via a data bus 908. Alternatively, the processing circuit 902 may be connected to the main memory 904 and/or static memory 906 directly or via some other connectivity means. The processing circuit 902 may be a controller, and the main memory 904 or static memory 906 may be any type of memory.

The processing circuit 902 represents one or more general-purpose processing circuits such as a microprocessor, central processing unit, or the like. More particularly, the processing circuit 902 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 902 is configured to execute processing logic in instructions 916 for performing the operations and steps discussed herein.

The computer system 900 may further include a network interface device 910. The computer system 900 also may or may not include an input 912 to receive input and selections to be communicated to the computer system 900 when executing instructions. The computer system 900 also may or may not include an output 914, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 900 may or may not include a data storage device that includes instructions 916 stored in a computer-readable medium 918. The instructions 916 may also reside, completely or at least partially, within the main memory 904 and/or within the processing circuit 902 during execution thereof by the computer system 900, the main memory 904 and the processing circuit 902 also constituting the computer-readable medium 918. The instructions 916 may further be transmitted or received over a network 920 via the network interface device 910.

While the computer-readable medium 918 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters." and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:

1. A radio access node, comprising:
- a radio frequency (RF) frontend circuit configured to receive a measurement report indicating a link quality measurement performed in a serving cell served by the radio access node; and
- a processing circuit configured to:
  - determine whether to request a user equipment (UE) measurement gap configuration based on the received measurement report;
  - request the UE measurement gap configuration in response to determining that the UE measurement gap configuration is to be requested; and
  - indicate to a master radio access node that a UE measurement gap is required in response to determining that the UE measurement gap configuration is to be requested.

2. The radio access node of claim 1, wherein the processing circuit is further configured to:
- compare the link quality measurement received in the measurement report with a predefined threshold;
- determine to request the UE measurement gap configuration when the link quality measurement is below the predefined threshold; and
- determine not to request the UE measurement gap configuration when the link quality measurement is above or equal to the predefined threshold.

3. The radio access node of claim 1, wherein the RF frontend circuit is further configured to receive the measurement report indicating the link quality measurement performed by a UE in response to an A2 event in the serving cell.

4. The radio access node of claim 3, wherein the processing circuit is further configured to:
- receive, from the master radio access node, a set of parameters for configuring the UE measurement gap; and
- communicate the set of received parameters to the UE in the serving cell.

5. The radio access node of claim 4, wherein the processing circuit is further configured to configure the UE to perform channel measurement without knowledge from the master radio access node.

6. A method for configuring a user equipment (UE) measurement gap in a wireless communications system (WCS), comprising:

receiving a measurement report indicating a link quality measurement performed in a serving cell served by a radio access node;

determining whether to request a UE measurement gap configuration based on the received measurement report;

initiating the UE measurement gap configuration in response to determining that the UE measurement gap configuration is to be requested; and indicating to a master radio access node that a UE measurement gap is required in response to determining that the UE measurement gap configuration is to be requested.

7. The method of claim 6, further comprising:

comparing the link quality measurement received in the measurement report with a predefined threshold;

determining to request the UE measurement gap configuration when the link quality measurement is below the predefined threshold; and determining not to request the UE measurement gap configuration when the link quality measurement is above or equal to the predefined threshold.

8. The method of claim 6, further comprising receiving the measurement report indicating the link quality measurement performed by a UE in response to an A2 event in the serving cell.

9. The method of claim 8, further comprising:

receiving, from the master radio access node, a set of parameters for configuring the UE measurement gap; and communicating the set of received parameters to the UE in the serving cell.

10. The method of claim 9, further comprising configuring the UE to perform channel measurement without knowledge from the master radio access node.

11. A wireless communications system (WCS), comprising:

a distribution unit configured to distribute a plurality of data signals; and a plurality of radio access nodes coupled to the distribution unit, wherein at least one of the plurality of radio access nodes comprises:

a radio frequency (RF) frontend circuit configured to receive a measurement report indicating a link quality measurement performed in a serving cell served by the at least one of the plurality of radio access nodes; and a processing circuit configured to:

determine whether to request a user equipment (UE) measurement gap configuration based on the received measurement report; and request the UE measurement gap configuration in response to determining that the UE measurement gap configuration is to be requested; and indicate to a master radio access node that a UE measurement gap is required in response to determining that the UE measurement gap configuration is to be requested.

12. The WCS of claim 11, wherein the processing circuit is further configured to:

compare the link quality measurement received in the measurement report with a predefined threshold;

determine to request the UE measurement gap configuration when the link quality measurement is below the predefined threshold; and determine not to request the UE measurement gap configuration when the link quality measurement is above or equal to the predefined threshold.

13. The WCS of claim 11, further comprising at least one UE located in the serving cell of the at least one of the plurality of radio access nodes, the at least one UE is configured to:

perform the link quality measurement in response to an A2 event in the serving cell; and communicate the measurement report indicating the link quality measurement to the at least one of the plurality of radio access nodes.

14. The WCS of claim 13, wherein at least another one of the plurality of radio access nodes is configured to serve as the master radio access node.

15. The WCS of claim 14, wherein the processing circuit is further configured to:

receive, from the master radio access node, a set of parameters for configuring the UE measurement gap; and communicate the set of received parameters to the UE in the serving cell.

16. The WCS of claim 15, wherein the processing circuit is further configured to configure the UE to perform channel measurement without knowledge from the master radio access node.

17. The WCS of claim 15, wherein the master radio access node is configured to instruct the at least one UE to perform the UE measurement gap configuration based on the set of parameters received from the plurality of radio access nodes.

18. The WCS of claim 11, further comprising:

a digital routing unit coupled to the distribution unit; and a plurality of remote units coupled to the digital routing unit via a plurality of optical fiber-based communications mediums.

19. The WCS of claim 18, wherein:

the digital routing unit comprises:

an electrical-to-optical (E/O) converter configured to convert a plurality of downlink communications signals into a plurality of downlink optical communications signals, respectively; and an optical-to-electrical (O/E) converter configured to convert a plurality of uplink optical communications signals into a plurality of uplink communications signals, respectively; and the plurality of remote units each comprises:

a respective O/E converter configured to convert a respective one of the plurality of downlink optical communications signals into a respective one of the plurality of downlink communications signals; and a respective E/O converter configured to convert a respective one of the plurality of uplink communications signals into a respective one of the plurality of uplink optical communications signals.

* * * * *